United States Patent
Mori

(10) Patent No.: US 11,658,555 B2
(45) Date of Patent: May 23, 2023

(54) ACTUATOR

(71) Applicant: NIDEC SANKYO CORPORATION, Nagano (JP)

(72) Inventor: Akira Mori, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 199 days.

(21) Appl. No.: 17/241,080

(22) Filed: Apr. 27, 2021

(65) Prior Publication Data

US 2021/0336520 A1 Oct. 28, 2021

(30) Foreign Application Priority Data

Apr. 28, 2020 (JP) .............................. JP2020-079167
Jun. 22, 2020 (JP) .............................. JP2020-106666

(51) Int. Cl.
*H02K 33/18* (2006.01)

(52) U.S. Cl.
CPC .................................. *H02K 33/18* (2013.01)

(58) Field of Classification Search
CPC ........ H02K 35/00; H02K 35/02; H02K 35/04; H02K 35/06; H02K 33/16; H02K 33/18; H02K 33/00; H02K 33/02; H02K 33/04; H02K 33/06; H02K 7/1869; H02K 7/1876; H02N 11/00; H02N 11/002; H02N 11/04
USPC ....... 310/29, 12, 12.12, 12.01, 12.03, 12.13, 310/12.16, 12.26, 25, 15, 24
See application file for complete search history.

(56) References Cited

U.S. PATENT DOCUMENTS

| | | | | | |
|---|---|---|---|---|---|
| 4,412,317 A | * | 10/1983 | Asjes | ..................... | G01V 1/181 367/187 |
| 6,326,706 B1 | * | 12/2001 | Zhang | .................. | F04B 35/045 310/12.32 |
| 6,501,357 B2 | * | 12/2002 | Petro | ...................... | H02K 33/16 335/229 |
| 6,644,943 B1 | * | 11/2003 | Lilie | ..................... | F04B 35/045 417/418 |
| 6,737,780 B1 | * | 5/2004 | Fisher | ...................... | H02K 1/17 310/154.14 |
| 6,983,923 B2 | * | 1/2006 | Fukui | .................... | F16K 31/082 335/229 |
| 7,078,832 B2 | * | 7/2006 | Inagaki | .................... | H02K 7/14 335/238 |

(Continued)

FOREIGN PATENT DOCUMENTS

JP 2019013086 1/2019

*Primary Examiner* — Maged M Almawri
(74) *Attorney, Agent, or Firm* — JCIPRNET

(57) ABSTRACT

An actuator includes a connection body connected with a support body and a movable body and having at least one of elasticity and viscoelasticity, and a magnetic drive mechanism structured to relatively move the movable body with respect to the support body. The connection body formed in a tube shape is disposed on both end sides in the vibration direction of the movable body. In a state that the movable body is located at a home position, the inner peripheral part connected with one of the movable body and the support body of each of the connection bodies is pulled to a center side in the vibration direction of the movable body with respect to its outer peripheral part connected with the other of the movable body and the support body and is shear-deformed.

7 Claims, 6 Drawing Sheets

(56) References Cited

U.S. PATENT DOCUMENTS

| | | | | |
|---|---|---|---|---|
| 7,449,803 B2* | 11/2008 | Sahyoun | H02K 33/16 | 310/23 |
| 7,573,163 B2* | 8/2009 | Tu | H02K 39/00 | 310/12.21 |
| 7,586,220 B2* | 9/2009 | Roberts | H02K 1/34 | 290/1 R |
| 7,671,493 B2* | 3/2010 | Takashima | G06F 3/016 | 310/15 |
| 7,791,456 B2* | 9/2010 | Miura | B06B 1/045 | 340/407.1 |
| 7,911,098 B2* | 3/2011 | Lee | H02K 33/16 | 310/20 |
| 7,948,124 B1* | 5/2011 | Waters | H02K 35/00 | 310/36 |
| 8,013,480 B2* | 9/2011 | Bang | B06B 1/045 | 310/12.33 |
| 8,097,991 B2* | 1/2012 | Masami | H02K 33/16 | 310/15 |
| 8,188,623 B2* | 5/2012 | Park | H02K 33/16 | 310/12.01 |
| 8,278,786 B2* | 10/2012 | Woo | H02K 33/16 | 310/15 |
| 8,288,899 B2* | 10/2012 | Park | H02K 33/16 | 310/71 |
| 8,314,519 B2* | 11/2012 | Eckstein | F16H 25/20 | 310/12.01 |
| 8,446,055 B2* | 5/2013 | Jun | H02K 33/16 | 310/23 |
| 8,456,032 B2* | 6/2013 | Hochberg | H02K 7/06 | 290/43 |
| 8,492,937 B2* | 7/2013 | Roberts | H02K 1/34 | 310/32 |
| 8,575,794 B2* | 11/2013 | Lee | H02K 33/18 | 310/15 |
| 8,593,017 B2* | 11/2013 | Stefanini | H02K 35/02 | 290/1 R |
| 8,736,086 B2* | 5/2014 | Yang | H02K 35/02 | 290/1 R |
| 9,461,530 B2* | 10/2016 | Wasenczuk | B06B 1/04 | |
| 9,695,806 B2* | 7/2017 | Van Brunt | H02K 33/16 | |
| 9,815,085 B2* | 11/2017 | Chun | G06F 3/016 | |
| 9,906,109 B2* | 2/2018 | Endo | H02K 33/16 | |
| 10,079,531 B2* | 9/2018 | Xu | H02K 5/04 | |
| 10,307,791 B2* | 6/2019 | Xu | B06B 1/045 | |
| 10,328,461 B2* | 6/2019 | Xu | B06B 1/045 | |
| 10,486,196 B2* | 11/2019 | Chai | B06B 1/045 | |
| 10,622,538 B2* | 4/2020 | Zhang | H01L 41/083 | |
| 10,710,115 B2* | 7/2020 | Huang | H02K 33/02 | |
| 11,031,857 B2* | 6/2021 | Wasenczuk | H02K 35/02 | |
| 11,152,843 B2* | 10/2021 | Wasenczuk | H02K 1/34 | |
| 11,418,099 B2* | 8/2022 | Takahashi | H02K 33/06 | |
| 2004/0119343 A1* | 6/2004 | Ueda | G10K 9/18 | 310/12.31 |
| 2005/0225181 A1* | 10/2005 | Tu | H02K 35/00 | 310/15 |
| 2006/0002577 A1* | 1/2006 | Won | B06B 1/045 | 381/396 |
| 2007/0052302 A1* | 3/2007 | Cheung | B82Y 25/00 | 310/12.25 |
| 2007/0085425 A1* | 4/2007 | Hirashima | H02K 33/16 | 310/15 |
| 2007/0182257 A1* | 8/2007 | Miura | H04R 9/02 | 310/23 |
| 2008/0265692 A1* | 10/2008 | Roberts | H02K 1/34 | 310/15 |
| 2009/0250032 A1* | 10/2009 | Fullerton | H03K 3/45 | 123/143 B |
| 2010/0327672 A1* | 12/2010 | Roberts | H02K 1/34 | 310/25 |
| 2011/0018364 A1* | 1/2011 | Kim | H02K 33/18 | 310/20 |
| 2011/0018365 A1* | 1/2011 | Kim | B06B 1/045 | 310/20 |
| 2011/0062803 A1* | 3/2011 | Lee | H02K 33/18 | 310/29 |
| 2011/0068640 A1* | 3/2011 | Choi | H02K 5/04 | 310/25 |
| 2011/0089773 A1* | 4/2011 | Choi | H02K 33/16 | 310/25 |
| 2011/0133577 A1* | 6/2011 | Lee | H02K 33/18 | 310/15 |
| 2011/0193426 A1* | 8/2011 | Chung | H02K 33/16 | 310/25 |
| 2011/0198948 A1* | 8/2011 | Keisuke | H02K 5/225 | 310/25 |
| 2011/0198949 A1* | 8/2011 | Furuich | H02K 33/16 | 310/25 |
| 2011/0291497 A1* | 12/2011 | Choi | H02K 33/18 | 310/25 |
| 2012/0032535 A1* | 2/2012 | Park | H02K 35/02 | 310/25 |
| 2012/0098380 A1* | 4/2012 | Wang | H02K 15/0442 | 310/260 |
| 2012/0146557 A1* | 6/2012 | Pyo | H02P 31/00 | 310/25 |
| 2012/0169148 A1* | 7/2012 | Kim | H02K 33/16 | 310/25 |
| 2012/0293022 A1* | 11/2012 | Park | B06B 1/045 | 310/25 |
| 2013/0033128 A1* | 2/2013 | Yoon | H02K 33/18 | 310/25 |
| 2013/0033129 A1* | 2/2013 | Hong | B06B 1/045 | 310/25 |
| 2013/0043766 A1* | 2/2013 | Takahashi | H04R 17/00 | 310/326 |
| 2013/0099600 A1* | 4/2013 | Park | B06B 1/045 | 310/15 |
| 2013/0285479 A1* | 10/2013 | Kinoshita | H02K 35/02 | 310/12.12 |
| 2014/0062225 A1* | 3/2014 | Kim | H02K 33/00 | 310/15 |
| 2014/0077628 A1* | 3/2014 | Yamada | H02K 33/12 | 310/12.16 |
| 2014/0084710 A1* | 3/2014 | Endo | H02K 33/16 | 310/25 |
| 2014/0103751 A1* | 4/2014 | Furukawa | H02K 35/02 | 310/25 |
| 2014/0132089 A1* | 5/2014 | Jeon | H02K 33/18 | 310/14 |
| 2014/0265651 A1* | 9/2014 | Kim | H02K 33/16 | 310/25 |
| 2015/0194870 A1* | 7/2015 | Kim | H02K 33/18 | 310/25 |
| 2016/0013710 A1* | 1/2016 | Dong | H02K 33/16 | 310/25 |
| 2016/0126821 A1* | 5/2016 | Iwaki | H02K 7/08 | 310/12.21 |
| 2016/0149517 A1* | 5/2016 | Choi | H02N 1/04 | 427/58 |
| 2016/0149518 A1* | 5/2016 | Wang | F03B 13/14 | 310/310 |
| 2016/0190903 A1* | 6/2016 | Ohishi | H02K 35/04 | 310/28 |
| 2017/0033653 A1* | 2/2017 | Wang | H02K 33/16 | |
| 2017/0033673 A1* | 2/2017 | Wang | H02K 33/16 | |
| 2017/0216885 A1* | 8/2017 | Takeda | H01F 7/1615 | |
| 2017/0288523 A1* | 10/2017 | Katada | H02P 25/032 | |
| 2017/0346376 A1* | 11/2017 | Kim | H02K 15/02 | |
| 2018/0026514 A1* | 1/2018 | Mao | H02K 5/225 | 310/12.16 |
| 2018/0056329 A1* | 3/2018 | Akanuma | H02K 33/16 | |
| 2018/0297074 A1* | 10/2018 | Huang | B06B 1/045 | |
| 2019/0070635 A1* | 3/2019 | Takeda | H02K 33/18 | |
| 2020/0161955 A1 | 5/2020 | Kitahara et al. | | |

* cited by examiner

ACTUATOR

CROSS REFERENCE TO RELATED APPLICATION

The present invention claims priority under 35 U.S.C. § 119 to Japanese Application No. 2020-079167 filed Apr. 28, 2020 and Japanese Application No. 2020-106666 filed Jun. 22, 2020, the entire content of which is incorporated herein by reference.

TECHNICAL FIELD

At least an embodiment of the present invention may relate to an actuator which is structured to relatively move a movable body with respect to a support body.

BACKGROUND

An actuator has been proposed which includes a support body, a movable body, and a magnetic drive mechanism structured to vibrate the movable body with respect to the support body, and in which the movable body and the support body are connected with each other by a connection body having elasticity and viscoelasticity. In Japanese Patent Laid-Open No. 2019-13086 (Patent Literature 1), an actuator is disclosed in which a movable body is disposed in an inside of a cover formed in a rectangular parallelepiped shape and the movable body is vibrated in a longitudinal direction of the cover. In the actuator described in Patent Literature 1, a connection body is a gel member which is formed by cutting sheet-shaped gel in a rectangular shape. A movable body includes a yoke to which a magnet is fixed, and one face of the connection body (gel member) in its thickness direction is adhesively bonded to the yoke and the other face of the connection body is adhesively bonded to a cover member.

The present inventor proposes an actuator in which a movable body is accommodated on an inner side of a tube-shaped case and the movable body is vibrated in an axial line direction. The movable body includes a support shaft extending in the axial line direction at a center of the case, and both ends in the axial line direction of the support shaft are connected with the case through connection bodies in a cylindrical tube shape. The connection body is a gel member and both ends of the case are closed by cap members.

In the actuator structured as described above, when the movable body is vibrated in the axial line direction, stress is concentrated on an inner peripheral part of the connection body. Therefore, the inner peripheral part of the connection body may be easily separated from the movable body. When the connection body is easy to be separated from the movable body, durability of the actuator is deteriorated.

Further, in the actuator in which the movable body is vibrated in the axial line direction, in order to avoid collision of the cap members closing both ends of the case with the movable body, clearances are required to provide between the movable body and the cap members. Therefore, a size in the axial line direction of the actuator is increased.

SUMMARY

In view of the problem described above, at least an embodiment of the present invention may advantageously provide an actuator in which both ends of a movable body are connected with a support body by a connection body, and a size of the actuator is reduced and its durability is enhanced.

According to at least an embodiment of the present invention, there may be provided an actuator including a support body, a movable body, a connection body which is connected with the support body and the movable body and is provided with at least one of elasticity and viscoelasticity, and a magnetic drive mechanism structured to relatively move the movable body with respect to the support body. The connection body includes a first connection body disposed on one end side in a vibration direction of the movable body and a second connection body disposed on the other end side in the vibration direction of the movable body, and each of the first connection body and the second connection body is formed in a tube shape. An inner peripheral part of the first connection body and an inner peripheral part of the second connection body are connected with one of the movable body and the support body, and an outer peripheral part of the first connection body and an outer peripheral part of the second connection body are connected with the other of the movable body and the support body. In a state that the movable body is located at a home position, the inner peripheral part of the first connection body is pulled to a side of the second connection body with respect to the outer peripheral part of the first connection body and is shear-deformed, and the inner peripheral part of the second connection body is pulled to a side of the first connection body with respect to the outer peripheral part of the second connection body and is shear-deformed.

In at least an embodiment of the present invention, in a state that the movable body is located at a home position, the first connection body disposed on one end side in the vibration direction of the movable body and the second connection body disposed on the other end side in the vibration direction of the movable body are structured so that an inner peripheral part of the first connection body and an inner peripheral part of the second connection body are pulled in directions coming close to each other and are shear-deformed. As described above, when the inner peripheral parts of the first connection body and the second connection body are set in a state that they are pulled toward a center in the vibration direction of the movable body, a size in the vibration direction of the movable body can be reduced and clearances to be secured on both sides in the vibration direction of the movable body can be reduced. Therefore, a size of the actuator can be reduced. Further, the inner peripheral parts of the first connection body and the second connection body are portions where stress is concentrated at the time of vibration of the movable body. However, in a case that the portions are previously pulled toward a center in the vibration direction of the movable body and are shear-deformed, when the movable body is vibrated, stress applied to the inner peripheral parts of both of the connection bodies can be relaxed. Therefore, there is less possibility that the inner peripheral parts of both of the connection bodies are separated from one of the movable body and the support body and thus, durability of the actuator can be enhanced.

In at least an embodiment of the present invention, the first connection body is provided with a first end face of the first connection body which faces an opposite side to the second connection body, the second connection body is provided with a first end face of the second connection body which faces an opposite side to the first connection body and, in the state that the movable body is located at the home position, an inner peripheral edge of the first end face of the first connection body is located on a second connection body side with respect to an outer peripheral edge of the first end face of the first connection body, and an inner peripheral edge of the first end face of the second connection body is located on a first connection body side with respect to an outer peripheral edge of the first end face of the second connection body. As described above, the first end face of the first connection body and the first end face of the second connection body are formed in a shape so that their inner peripheral edges are recessed toward a center in the vibration direction of the movable body at a home position and thus, when the movable body is vibrated, an angle formed by the first end face of the first connection body and an outer peripheral face of the first inner frame member, and an angle formed by the first end face of the second connection body and an outer peripheral face of the second inner frame member are hard to become small. Therefore, when the movable body is vibrated, there is less possibility that the inner peripheral parts of both of the connection bodies are separated from one of the movable body and the support body and thus, durability of the actuator can be enhanced.

In at least an embodiment of the present invention, each of the first connection body and the second connection body is a gel member, the first connection body is provided with a second end face of the first connection body which faces an opposite side to the first end face of the first connection body, the second end face of the first connection body is recessed to a side of the first end face of the first connection body, and the second connection body is provided with a second end face of the second connection body which faces an opposite side to the first end face of the second connection body, and the second end face of the second connection body is recessed to a side of the first end face of the second connection body. In a case that the connection body is a gel member, when the connection body is manufactured by casting, the connection body can be connected with the inner frame member and the outer frame member as one component by an adhesive force of the gel member itself at the time of forming. When the connection body is manufactured by casting, one end face (the first end face of the first connection body and the first end face of the second connection body) becomes a flat face which is formed by a molding member, and the other end face (the second end face of the first connection body and the second end face of the second connection body) becomes a recessed face by a surface tension of the gel material. When the connection body is connected with the inner frame member and the outer frame member at the time of forming as one component, a fixing process of the connection body by using an adhesive is not required at the time of assembling of the actuator. Therefore, handling of the connection body is easy and assembling of the actuator can be performed easily.

In at least an embodiment of the present invention, the magnetic drive mechanism includes a magnet and a coil, and the movable body includes a support shaft which supports a supported member including one of the magnet and the coil on an inner peripheral side with respect to the support body, a first inner frame member which is fixed to one end side of the support shaft, and a second inner frame member which is fixed to the other end side of the support shaft. The support body includes a first outer frame member which faces the first inner frame member in a radial direction, a second outer frame member which faces the second inner frame member in the radial direction, and a case in a tube shape which surrounds an outer peripheral side of the first outer frame member and an outer peripheral side of the second outer frame member, and the first connection body is connected with the first inner frame member and the first outer frame member, and the second connection body is connected with the second inner frame member and the second outer frame member. According to this structure, both ends of the movable body assembled with the support shaft as a center can be supported by the first connection body and the second connection body and thus, the movable body can be supported stably. Further, the first connection body is disposed in a space in the radial direction between the first inner frame member and the first outer frame member, and the second connection body is disposed in a space in the radial direction between the second inner frame member and the second outer frame member and thus, the movable body is hard to move in a direction different from the vibration direction. Therefore, there is less possibility that the movable body is moved in an unintended direction and is collided with the support body.

In at least an embodiment of the present invention, the first inner frame member is protruded to a second connection body side with respect to an end part on the second connection body side of the first outer frame member, and the second inner frame member is protruded to a first connection body side with respect to an end part on the first connection body side of the second outer frame member. As described above, when the inner frame member is protruded from the outer frame member, the front side and the rear side of the connection body can be recognized at a glance. Therefore, operations that the first connection body and the second connection body are assembled in a reverse posture in the axial line direction can be easily and correctly performed.

In at least an embodiment of the present invention, the first inner frame member is provided with a first fixing part to which the support shaft is press-fitted, and the second inner frame member is provided with a second fixing part to which the support shaft is press-fitted. As described above, when the first inner frame member and the second inner frame member are fixed by press-fitting, a fixing part such as a screw and a threaded hole are not required to provide and thus, a yield of material is satisfactory when the first inner frame member and the second inner frame member are to be manufactured and a working cost is also low. Therefore, a cost of a part can be reduced.

In at least an embodiment of the present invention, the first inner frame member is abutted with the supported member from one end side of the support shaft, and the second inner frame member is abutted with the supported member from the other end side of the support shaft. According to this structure, the supported member can be positioned in the axial line direction by the first inner frame member and the second inner frame member. Therefore, the magnet or the coil included in the supported member is easily positioned.

EFFECTS OF THE INVENTION

According to the present invention, in a state that the movable body is located at a home position, the first connection body disposed on one end side in the vibration direction of the movable body and the second connection body disposed on the other end side in the vibration direction of the movable body are structured so that an inner peripheral part of the first connection body and an inner peripheral part of the second connection body are pulled in directions coming close to each other and are shear-deformed. As described above, when the inner peripheral parts of the first connection body and the second connection body are set in a state that they are pulled toward a center in the vibration direction of the movable body, a size in the vibration direction of the movable body can be reduced and clearances to be secured on both sides in the vibration direction of the movable body can be reduced. Therefore, a size of the actuator can be reduced. Further, the inner peripheral parts of the first connection body and the second connection body are portions where stress is concentrated at the time when the movable body is vibrated. However, in a case that the portions are previously pulled toward a center in the vibration direction of the movable body and are shear-deformed, when the movable body is vibrated, stress applied to the inner peripheral parts of both of the connection bodies can be relaxed. Therefore, there is less possibility that the inner peripheral parts of both of the connection bodies are separated from one of the movable body and the support body and thus, durability of the actuator can be enhanced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
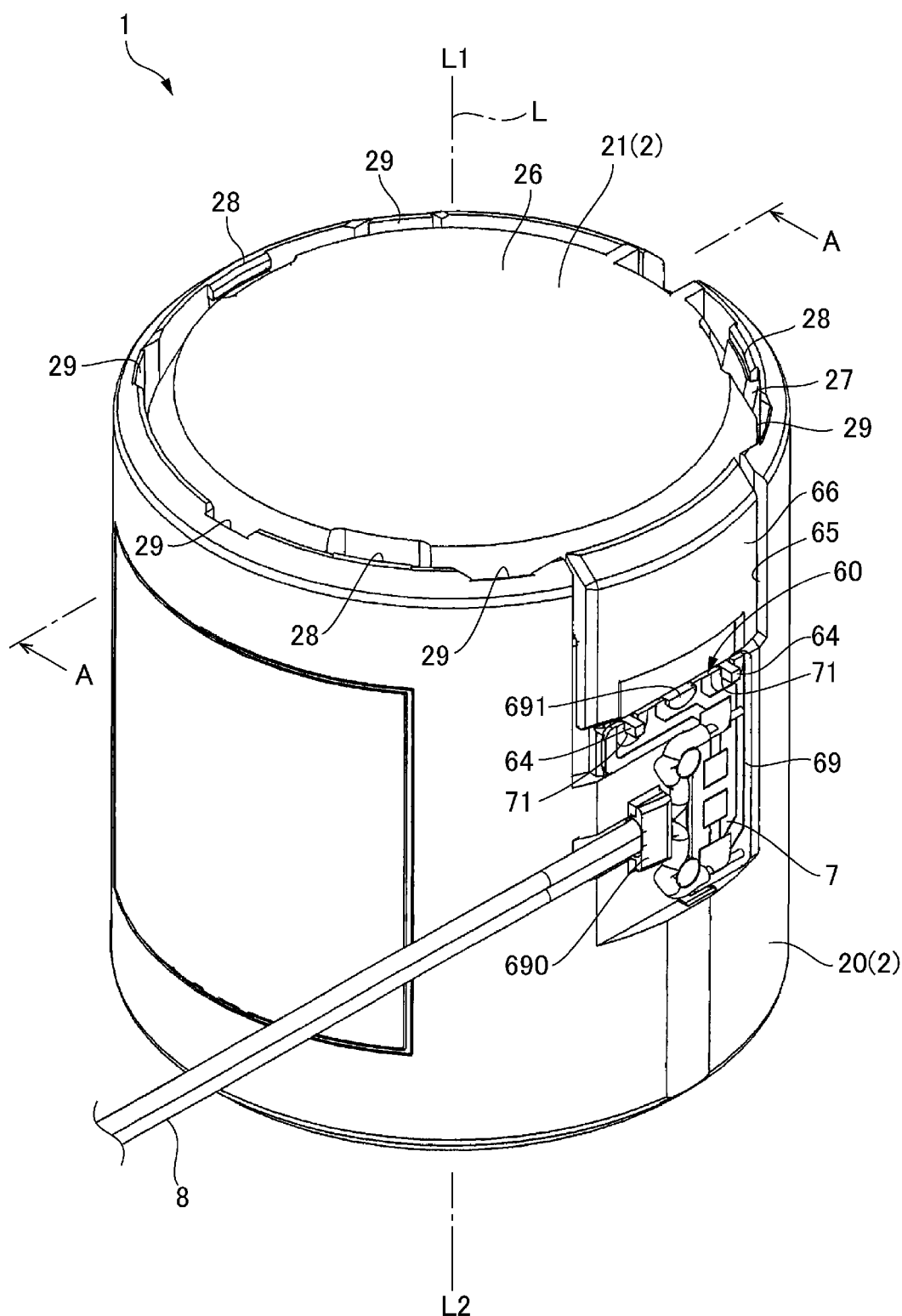
FIG. 1 is a perspective view showing an actuator in accordance with an embodiment of the present invention.

An embodiment of the present invention will be described below with reference to the accompanying drawings. In the following descriptions, a direction that a center axial line of a movable body 3 is extended is defined as an axial line "L" direction, and one side in the axial line "L" direction is referred to as "L1" and the other side in the axial line "L" direction is referred to as "L2". In an actuator 1 to which the present invention is applied, the movable body 3 is vibrated in the axial line "L" direction with respect to a support body 2.

In the embodiment described below, the movable body 3 is disposed on an inner peripheral side with respect to the support body 2. However, in the present invention, the movable body 3 may be disposed on an outer peripheral side with respect to the support body 2. Further, in the embodiment described below, a magnetic drive mechanism 6 which makes the movable body 3 vibrate with respect to the support body 2 includes a magnet 61 disposed on the movable body 3 and a coil 62 disposed on the support body 2. However, in the present invention, an arrangement of the magnet 61 and the coil 62 may be reversed. In other words, the magnetic drive mechanism 6 may include a coil 62 disposed on the movable body 3 and a magnet 61 disposed on the support body 2.

Entire Structure

Figure 2:
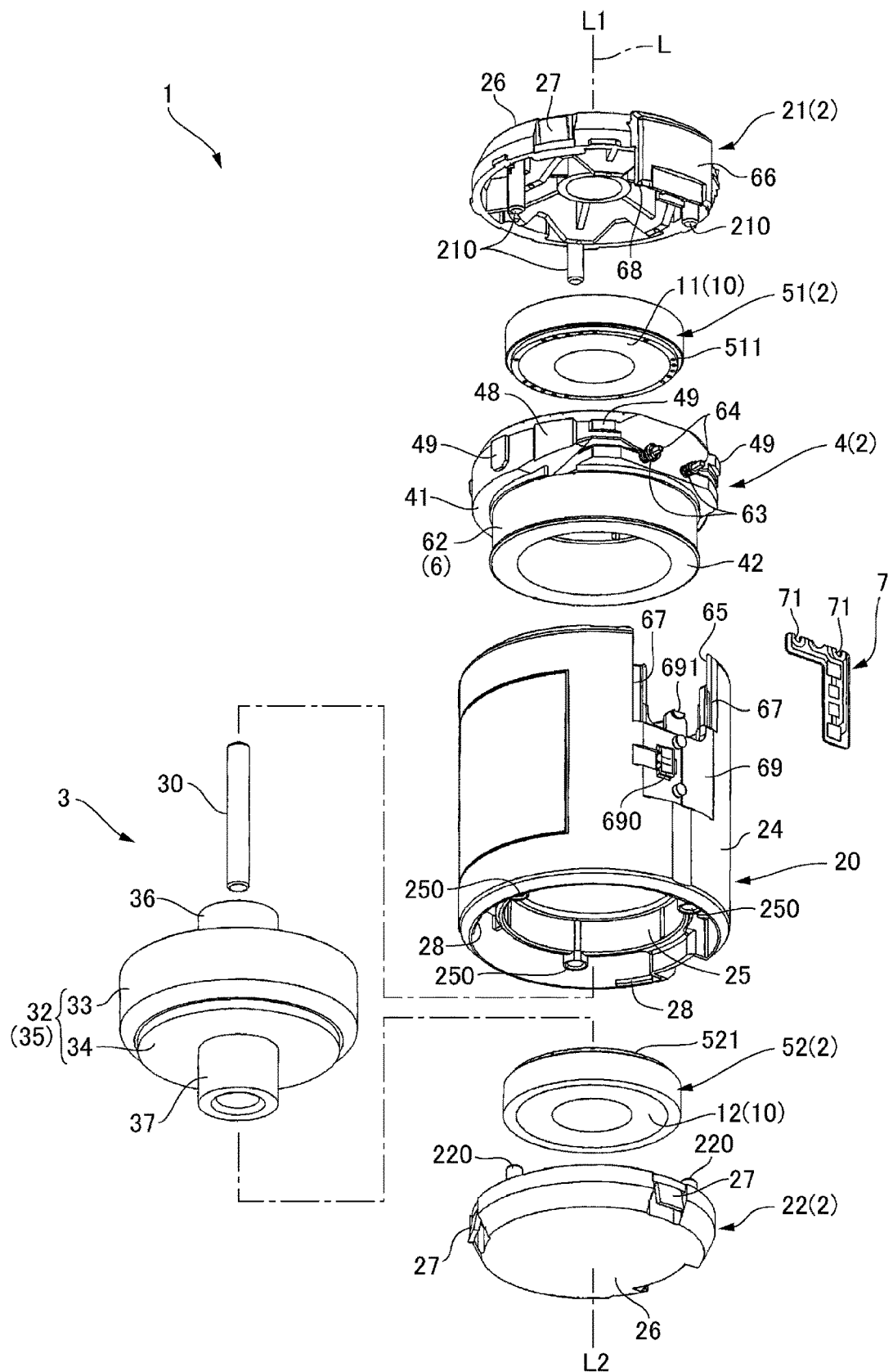
FIG. 2 is an exploded perspective view showing the actuator in FIG. 1.
Figure 3:
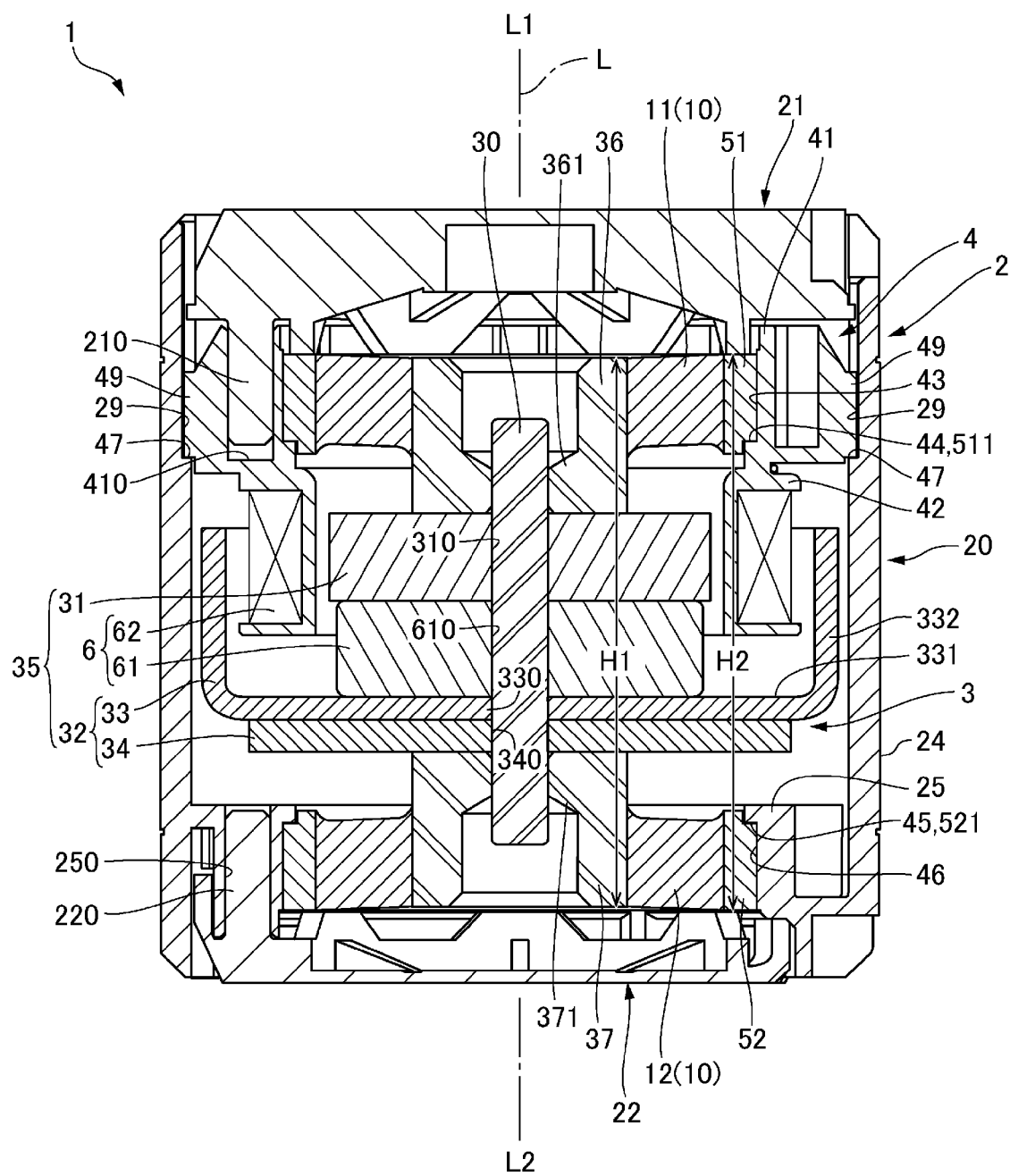
FIG. 3 is a cross-sectional view showing the actuator in FIG. 1 ("A-A" cross-sectional view in FIG. 1).

FIG. 1 is a perspective view showing an actuator 1 in accordance with an embodiment of the present invention. FIG. 2 is an exploded perspective view showing the actuator 1 in FIG. 1. FIG. 3 is a cross-sectional view showing the actuator 1 in FIG. 1. FIG. 3 is a cross-sectional view showing the actuator 1 which is cut at the "A-A" position in FIG. 1. The actuator 1 includes a support body 2, a movable body 3, a connection body 10 which is connected with the support body 2 and the movable body 3, and a magnetic drive mechanism 6 structured to relatively move the movable body 3 with respect to the support body 2. The connection body 10 is provided with at least one of elasticity and viscoelasticity. The magnetic drive mechanism 6 includes a magnet 61 disposed on the movable body 3, and a coil 62 disposed on the support body 2, and is structured so that the movable body 3 is relatively moved in the axial line "L" direction with respect to the support body 2. As shown in FIG. 3, the movable body 3 is connected with the support body 2 through the connection body 10 at respective positions of an end part on one side "L1" in the axial line "L" direction and an end part on the other side "L2" in the axial line "L" direction.

Support Body

The support body 2 includes a tube-shaped case 20, a first cap member 21 which closes an opening of the case 20 on one side "L1" in the axial line "L" direction, a second cap member 22 which closes an opening of the case 20 on the other side "L2" in the axial line "L" direction, and a coil holder 4 which is disposed between the first cap member 21 and the second cap member 22 on an inner peripheral side of the case 20. In this embodiment, the case 20, the first cap member 21, the second cap member 22, and the coil holder 4 are made of resin. Further, the support body 2 includes a first outer frame member 51 fitted to an inner peripheral side of the coil holder 4, and a second outer frame member 52 fitted to an inner peripheral side of the case 20 at a position separated from the first outer frame member 51 to the other side "L2" in the axial line "L" direction. The first outer frame member 51 and the second outer frame member 52 are structured in the same shape and are disposed in a reverse posture in the axial line "L" direction.

Connection Body

The connection body 10 includes a first connection body 11 in a ring shape which is joined to an inner peripheral face of the first outer frame member 51, and a second connection body 12 in a ring shape which is joined to an inner peripheral face of the second outer frame member 52. The first connection body 11 is disposed on one end side of the movable body 3 in the axial line "L" direction (in other words, a vibration direction of the movable body), and the second connection body 12 is disposed on the other end side of the movable body 3 in the axial line "L" direction. The first connection body 11 and the second connection body 12 are gel members and are joined to the first outer frame member 51 and the second outer frame member 52 by adhesiveness of the gel member itself. The first connection body 11 and the second connection body 12 are, for example, made of silicone gel whose penetration degree is 90 degrees through 110 degrees. In this embodiment, the first connection body 11 is connected with the support body 2 by press-fitting and fixing the first outer frame member 51 to the coil holder 4. Further, the second connection body 12 is connected with the support body 2 by press-fitting and fixing the second outer frame member 52 to the case 20.

Coil Holder

As shown in FIG. 2, the coil holder 4 is provided with a first outer frame member fixing part 41 formed in a ring shape and a body part 42 which is protruded from the first outer frame member fixing part 41 to the other side "L2" in the axial line "L" direction, and the coil 62 is disposed around the body part 42. End parts of a coil wire 63 extended from the coil 62 are bound to two terminal pins 64 which are protruded from the first outer frame member fixing part 41 of the coil holder 4 to an outer side in the radial direction. As shown in FIG. 1, the terminal pins 64 are protruded to the outside of the case 20 and are connected with a wiring circuit board 7.

As shown in FIG. 3, the coil holder 4 is provided with a first step part 44 which positions the first outer frame member 51 in the axial line "L" direction. The first outer frame member fixing part 41 surrounds an outer peripheral side of the first outer frame member 51. An inner peripheral face of the first outer frame member fixing part 41 is provided with a first recessed part 43 which is recessed to the other side "L2" in the axial line "L" direction, and the first outer frame member 51 is press-fitted to the first recessed part 43. The first step part 44 is provided at an end part of the first recessed part 43 on the other side "L2" in the axial line "L" direction. In this embodiment, a ring-shaped step part 511 formed on an outer peripheral face of the first outer frame member 51 is abutted with the first step part 44 in the axial line "L" direction.

Case

The case 20 is provided with a case main body 24 formed in a cylindrical tube shape and a second outer frame member fixing part 25 which is disposed on an inner peripheral side with respect to the case main body 24. As shown in FIG. 2, the second outer frame member fixing part 25 is protruded from an inner peripheral face of the case main body 24 to an inner peripheral side and is integrally molded together with the case main body 24. As shown in FIG. 3, the second outer frame member fixing part 25 is disposed at a position separated on the other side "L2" in the axial line "L" direction with respect to the coil holder 4.

The case 20 is provided with a second step part 45 which positions the second outer frame member 52 in the axial line "L" direction. As shown in FIG. 3, an inner peripheral face of the second outer frame member fixing part 25 is provided with a second recessed part 46 which is recessed to one side "L1" in the axial line "L" direction, and the second outer frame member 52 is press-fitted to the second recessed part 46. The second step part 45 is provided at an end part on one side "L1" in the axial line "L" direction of the second recessed part 46. In this embodiment, a ring-shaped step part 521 formed on an outer peripheral face of the second outer frame member 52 is abutted with the second step part 45 in the axial line "L" direction.

Further, the case 20 is provided with a third step part 47 which positions the coil holder 4 in the axial line "L" direction. As shown in FIG. 3, the third step part 47 is formed on an inner peripheral face of the case main body 24. The inner peripheral face of the case main body 24 is formed with a plurality of groove parts 29 extended in the axial line "L" direction, and the third step part 47 is formed at an end part on the other side "L2" in the axial line "L" direction of each of the groove parts 29. On the other hand, as shown in FIGS. 2 and 3, the coil holder 4 is provided with a plurality of protruded parts 49 which are protruded from the outer peripheral face of the first outer frame member fixing part 41. When the support body 2 is to be assembled, each of the protruded parts 49 of the coil holder 4 is fitted to each of the groove parts 29 of the case main body 24 from one side "L1" in the axial line "L" direction and is abutted with the third step part 47 in the axial line "L" direction. As a result, the coil holder 4 is press-fitted and fixed to the case main body 24, and the coil holder 4 is positioned in the axial line "L" direction.

Cap Member

As shown in FIG. 3, the first cap member 21 is fixed to the case main body 24 from one side "L1" in the axial line "L" direction with respect to the first outer frame member fixing part 41 provided in the coil holder 4. Further, the second cap member 22 is fixed to the case main body 24 from the other side "L2" in the axial line "L" direction with respect to the second outer frame member fixing part 25. As shown in FIG. 2, each of the first cap member 21 and the second cap member 22 is provided with a cover part 26 which is circular when viewed in the axial line "L" direction and a plurality of engaging parts 27 disposed at equal intervals at an outer peripheral edge of the cover part 26. In this embodiment, each of the first cap member 21 and the second cap member 22 is provided with three engaging parts 27. The engaging part 27 is a claw part which is inclined and extended in a direction enlarged from the cover part 26 to an outer peripheral side.

The engaging part 27 is elastically deformed in a radial direction and is pushed into an inner peripheral side of the case main body 24 together with the cover part 26. The case 20 is provided with restriction parts 28 which restrict disengagement of the engaging part 27 from an inner side of the case 20. The restriction part 28 is a protruded part which is protruded to an inner peripheral side from an end part of the case main body 24. As shown in FIGS. 1 and 2, the restriction part 28 is disposed at three positions at equal intervals in the end parts on one side "L1" and the other side "L2" in the axial line "L" direction of the case main body 24. The restriction part 28 is abutted with a tip end of the engaging part 27 in the axial line "L" direction.

The first cap member 21 is fixed to the case 20 by using an engagement structure of the engaging part 27 with the restriction part 28, together with fixing by an adhesive and welding. The adhesive is applied so as to serve as sealing material which seals a gap space between the end part on one side "L1" of the case 20 and the first cap member 21 after hardening. Therefore, in the support body 2 after having been assembled, a gap space between the first cap member 21 and the case 20 is sealed by an adhesive (not shown).

The first cap member 21 is fixed to the coil holder 4 by welding and is fixed to the case 20 through the coil holder 4. As shown in FIGS. 2 and 3, the first cap member 21 is provided with a plurality of welding protruded parts 210 which are protruded from the cover part 26 to the other side "L2" in the axial line "L" direction. On the other hand, as shown in FIG. 3, the coil holder 4 is provided with a plurality of welding recessed parts 410 which face the cover part 26 in the axial line "L" direction. In this embodiment, the welding protruded parts 210 and the welding recessed parts 410 are disposed at three positions at equal intervals in the circumferential direction. When the first cap member 21 is to be fixed to the case 20, as shown in FIG. 3, each of the welding protruded parts 210 is welded to each of the welding recessed parts 410 of the coil holder 4.

The second cap member 22 is, similarly to the first cap member 21, fixed to the case 20 by using an engagement structure of the engaging part 27 with the restriction part 28, together with fixing by an adhesive and welding. The adhesive is applied so as to serve as sealing material which seals a gap space between the end part on the other side "L2" of the case 20 and the second cap member 22 after hardening. Therefore, in the support body 2 after having been assembled, a gap space between the second cap member 22 and the case 20 is sealed by an adhesive (not shown).

The second cap member 22 is fixed to the second outer frame member fixing part 25 of the case 20 by welding. As shown in FIGS. 2 and 3, the second cap member 22 is provided with a plurality of welding protruded parts 220 which are protruded from the cover part 26 to one side "L1" in the axial line "L" direction. On the other hand, the second outer frame member fixing part 25 is provided with a plurality of welding holes 250 which face the cover part 26 in the axial line "L" direction. In this embodiment, the welding protruded parts 220 and the welding holes 250 are disposed at three positions at equal intervals in the circumferential direction. When the second cap member 22 is to be fixed to the case 20, as shown in FIG. 3, each of the welding protruded parts 220 is welded to each of the welding holes 250 of the second outer frame member fixing part 25.

As shown in FIG. 2, the first outer frame member fixing part 41 of the coil holder 4 is provided with groove parts 48 which are formed by cutting out its portion overlapped in the axial line "L" direction with the three restriction parts 28 provided in the case main body 24 to an inner peripheral side. Therefore, when the coil holder 4 is to be inserted into an inside of the case main body 24, interference of the first outer frame member fixing part 41 with the restriction parts 28 is avoided.

Wiring Lead-Out Part

As shown in FIG. 1, the support body 2 includes a wiring lead-out part 60 for leading out terminal pins 64 to the outside, around which coil wires 63 extended from the coil 62 of the magnetic drive mechanism 6 are bound. The wiring lead-out part 60 is a space provided between a cut-out part 65, which is formed by cutting out an edge on one side "L1" in the axial line "L" direction of the case 20 to the other side "L2" in the axial line "L" direction, and a cover 66 which is extended from a part in a circumferential direction of an outer peripheral edge of the first cap member 21 to the other side "L2" in the axial line "L" direction.

The first outer frame member fixing part 41 of the coil holder 4 is disposed on an inner peripheral side of the cut-out part 65. In this embodiment, two terminal pins 64 extended from the first outer frame member fixing part 41 to an outer peripheral side are disposed in the wiring lead-out part 60. The coil wires 63 extended from the coil 62 are respectively bound to root portions of the terminal pins 64.

As shown in FIG. 2, each of edges on both sides in the circumferential direction of the cut-out part 65 is formed with a groove part 67 which is opened to an outer side in the radial direction. The cover 66 is provided with a curved shape which is located on a substantially same face as an outer peripheral face of the case main body 24, and each of edges on both sides in the circumferential direction of the cover 66 is provided with an engaging part 68 which is protruded to an inner side in the radial direction. When the cover 66 is to be inserted to the cut-out part 65 from one side in the axial line "L" direction, each of the engaging parts 68 of the cover 66 is inserted into each of the two groove parts 67 provided at edges on both sides in the circumferential direction of the cut-out part 65. As a result, the edges of the cut-out part 65 are engaged with the cover 66 and thus, it is restrained that a width of the cut-out part 65 is widened and the case 20 is deformed.

The case 20 is provided with a circuit board fixing part 69 which is formed on the other side "L2" with respect to the cut-out part 65. An end part on one side "L1" of the wiring circuit board 7 which is fixed to the circuit board fixing part 69 is disposed in the wiring lead-out part 60. The terminal pins 64 are positioned by holding grooves 71 provided at an edge of the wiring circuit board 7 and are electrically connected with lands formed at edges of the holding groove 71. The wiring circuit board 7 is connected with lead wires 8 for power feeding to the coil 62. The circuit board fixing part 69 is provided with a lead wire holding part 690 for holding the lead wires 8 at a position adjacent to the wiring circuit board 7 in the circumferential direction.

The circuit board fixing part 69 is provided with a claw part 691 which is engaged with an edge of the wiring circuit board 7 disposed in the cut-out part 65. The wiring circuit board 7 is fixed to the circuit board fixing part 69 by using an engagement structure of the claw part 691 together with fixing of an adhesive. The adhesive for fixing the wiring circuit board 7 is applied so as to be sealing material which seals a space between the wiring circuit board 7 and the case 20 and a space between a tip end of the cover 66 and the wiring circuit board 7. Therefore, in the support body 2 after having been assembled, the space between the wiring circuit board 7 and the case 20 and the space between the wiring circuit board 7 and the first cap member 21 are completely sealed by the adhesive (not shown). Further, when the first cap member 21 is to be fixed to the case 20, an adhesive is applied to a space between the cover 66 and the cut-out part 65. Therefore, the space between the cover 66 and the cut-out part 65 is also sealed by the adhesive (not shown).

Movable Body 3

As shown in FIGS. 2 and 3, the movable body 3 includes a support shaft 30 which is extended in the axial line "L" direction at a center in the radial direction of the support body 2. A magnet 61 and a yoke 35 are fixed to the support shaft 30 by a first inner frame member 36 formed in a tube shape and a second inner frame member 37 formed in a tube shape. The support shaft 30 is a round bar made of metal. The first inner frame member 36 and the second inner frame member 37 are circular tube bodies made of metal, and the first inner frame member 36 and the second inner frame member 37 are provided with circular through holes. The first inner frame member 36 and the second inner frame member 37 are formed in the same shape as each other and are disposed in a reverse posture in the axial line "L" direction.

The first inner frame member 36 faces the first outer frame member 51 in the radial direction, and the first connection body 11 is disposed between the first inner frame member 36 and the first outer frame member 51. Further, the second inner frame member 37 faces the second outer frame member 52 in the radial direction, and the second connection body 12 is disposed between the second inner frame member 37 and the second outer frame member 52. As described above, the first connection body 11 and the second connection body 12 are gel members, and the first connection body 11 is joined to the first inner frame member 36 and the second connection body 12 is joined to the second inner frame member 37 by adhesiveness of the gel member itself. The first connection body 11 and the second connection body 12 are connected with the movable body 3 by press-fitting and fixing the support shaft 30 to the first inner frame member 36 and the second inner frame member 37.

As shown in FIG. 3, an inner peripheral face of the first inner frame member 36 is formed with a ring-shaped protruded part 361 which is protruded to an inner side in the radial direction at an end part on the other side "L2" in the axial line "L" direction. When the first inner frame member 36 is press-fitted to the support shaft 30, the support shaft 30 is press-fitted to the ring-shaped protruded part 361. Therefore, the ring-shaped protruded part 361 is a first fixing part to which the support shaft 30 is press-fitted. Further, an inner peripheral face of the second inner frame member 37 is formed with a ring-shaped protruded part 371 which is protruded to an inner side in the radial direction at an end part on one side "L1" in the axial line "L" direction. When the second inner frame member 37 is press-fitted to the support shaft 30, the support shaft 30 is press-fitted to the ring-shaped protruded part 371. Therefore, the ring-shaped protruded part 371 is a second fixing part to which the support shaft 30 is press-fitted.

The magnet 61 is provided with a shaft hole 610 through which the support shaft 30 is penetrated and is fixed to a substantially center in the axial line "L" direction of the support shaft 30. The yoke 35 includes a first yoke 31 overlapped with the magnet 61 on one side "L1" in the axial line "L" direction and a second yoke 32 which is overlapped with the magnet 61 on the other side "L2" in the axial line "L" direction. The first yoke 31 is formed in a circular plate shape which is provided with a shaft hole 310 through which the support shaft 30 is penetrated, and outer diameters of the magnet 61 and the first yoke 31 are substantially equal to each other. The second yoke 32 is structured of two members, i.e., a first magnetic member 33 formed in a cup shape and a second magnetic member 34 formed in a circular plate shape. The first magnetic member 33 is provided with a circular end plate part 331 provided with a shaft hole 330 through which the support shaft 30 is penetrated and a cylindrical tube part 332 which is extended from an outer edge of the end plate part 331 to one side "L1" in the axial line "L" direction. In this embodiment, the end plate part 331 of the first magnetic member 33 is fixed to an end face of the magnet 61 on the other side "L2" in the axial line "L" direction. The second magnetic member 34 is provided with a shaft hole 340 through which the support shaft 30 is penetrated and is fixed to the end plate part 331 of the first magnetic member 33 from an opposite side to the magnet 61.

In the movable body, the first inner frame member 36 and the second inner frame member 37 are fixed to the support shaft 30 on both sides in the axial line "L" direction of the magnet 61 and the yoke 35 in a state that the support shaft 30 is penetrated through the shaft holes 310, 610, 330 and 340 of the magnet 61 and the respective members structuring the yoke 35. As a result, the first inner frame member 36 supports the magnet 61 and the yoke 35 from one side "L1" in the axial line "L" direction and the second inner frame member 37 supports the magnet 61 and the yoke 35 from the other side "L2" in the axial line "L" direction and, in this manner, the magnet 61 and the yoke 35 are fixed to the support shaft 30.

The magnet 61 and the yoke 35 structure a supported member which is fixed to the support shaft 30 by the first inner frame member 36 and the second inner frame member 37. The ring-shaped protruded part 361 (first fixing part) is provided at an end part on the other side "L2" in the axial line "L" direction of the first inner frame member 36 and is abutted with the magnet 61 and the yoke 35 (supported member) from one side "L1" in the axial line "L" direction. Further, the ring-shaped protruded part 371 (second fixing part) is provided at an end part on one side "L1" in the axial line "L" direction of the second inner frame member 37 and is abutted with the magnet 61 and the yoke 35 (supported member) from the other side "L2" in the axial line "L" direction.

In the second yoke 32, an inside diameter of the cylindrical tube part 332 of the first magnetic member 33 is larger than outside diameters of the magnet 61 and the first yoke 31. Therefore, when the magnet 61 and the first yoke 31 are overlapped with the circular end plate part 331 which is a bottom part of the cylindrical tube part 332, the cylindrical tube part 332 faces an outer peripheral face of the magnet 61 and an outer peripheral face of the first yoke 31 at positions separated from the outer peripheral face of the magnet 61 and the outer peripheral face of the first yoke 31 to an outer side in the radial direction. In this embodiment, a part of the coil 62 is disposed between the cylindrical tube part 332 and the outer peripheral face of the magnet 61. Further, a part of the coil 62 is disposed between the cylindrical tube part 332 and the outer peripheral face of the first yoke 31.

Manufacturing Method of Connection Body

Figure 4A:
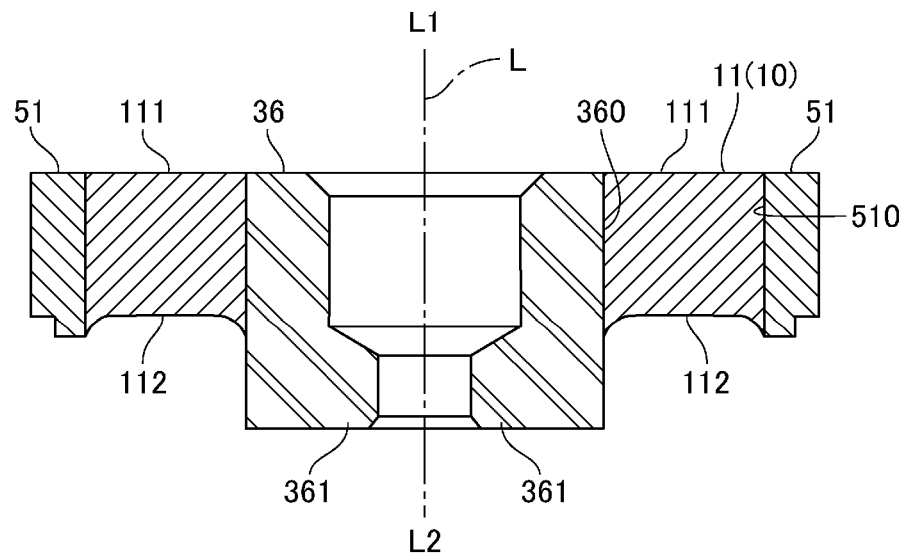
FIGS. 4A and 4B are cross-sectional views showing a connection body to which an inner frame member and an outer frame member are fixed.
Figure 4B:
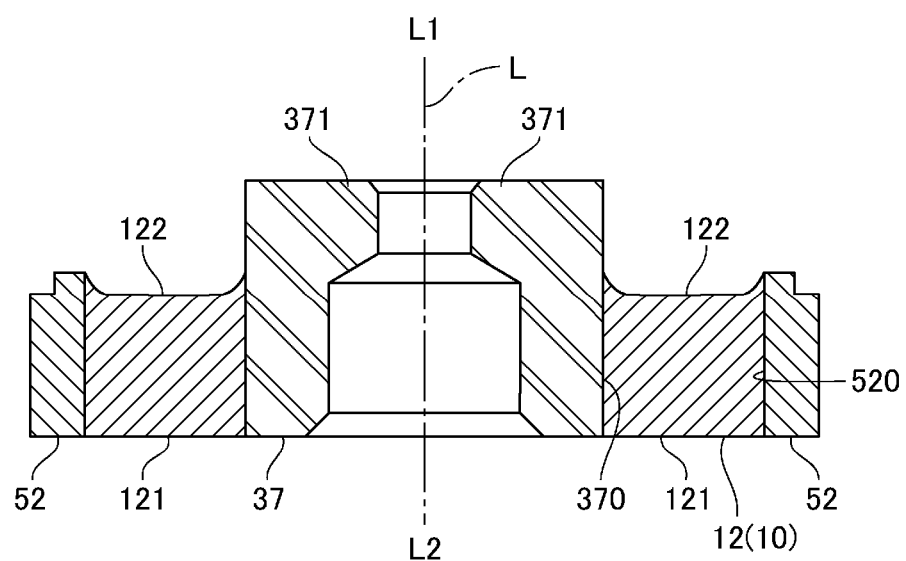

FIGS. 4A and 4B are cross-sectional views showing the connection body 10 to which the inner frame member and the outer frame member are fixed. FIG. 4A is a cross-sectional view showing the first connection body 11 to which the first inner frame member 36 and the first outer frame member 51 are fixed, and FIG. 4B is a cross-sectional view showing the second connection body 12 to which the second inner frame member 37 and the second outer frame member 52 are fixed. The first connection body 11 and the second connection body 12 are gel members formed by gel material and are manufactured by casting.

As shown in a FIG. 4A, the first connection body 11 is joined to the first outer frame member 51 and the first inner frame member 36 to be structured as one part when the first connection body 11 is formed. Further, as shown in a FIG. 4B, the second connection body 12 is joined to the second outer frame member 52 and the first inner frame member 37 to be structured as one part when the second connection body 12 is formed. Therefore, when the actuator 1 is to be assembled, the support body 2 and the movable body 3 can be connected with each other without performing a process for adhesively bonding a gel member.

Figure 5:
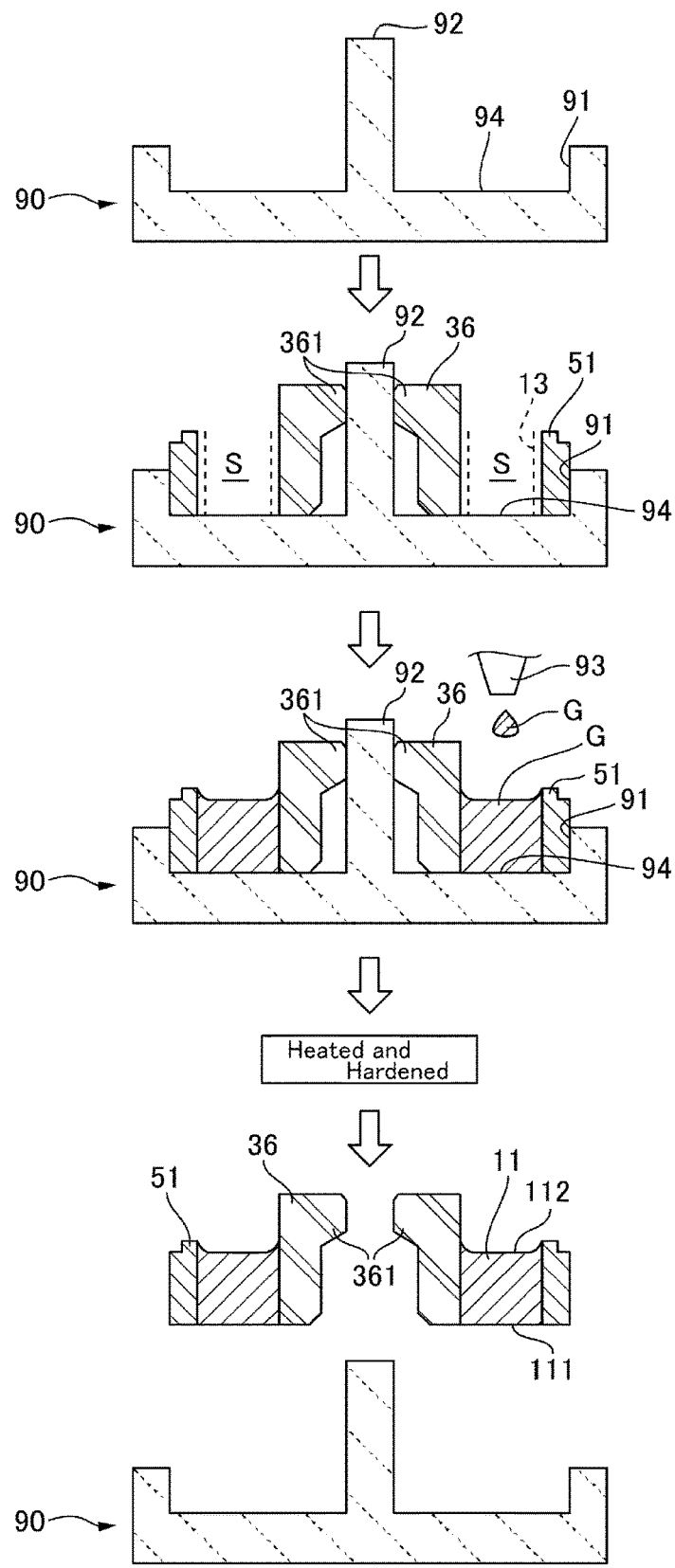
FIG. 5 is an explanatory view showing a manufacturing method of a connection body.

FIG. 5 is an explanatory view showing a manufacturing method of the connection body 10. The manufacturing method of the first connection body 11 will be described below with reference to FIG. 5. A manufacturing method of the second connection body 12 is the same as the manufacturing method of the first connection body 11 and thus, its description is omitted. As shown in FIG. 5, in a first process, a pin 92 protruded from a center of a circular recessed part 91 provided in a manufacturing jig 90 is inserted into the first inner frame member 36, and the first inner frame member 36 is abutted with a bottom face 94 of the circular recessed part 91. Further, an outer peripheral face of the first outer frame member 51 is contacted with an inner peripheral face of the circular recessed part 91, and the first outer frame member 51 is abutted with the bottom face 94 of the circular recessed part 91. As a result, the first inner frame member 36 and the first outer frame member 51 are positioned and a ring-shaped space "S" is formed between the first inner frame member 36 and the first outer frame member 51.

In this embodiment, the first inner frame member 36 is provided with the ring-shaped protruded part 361 (first fixing part) for fixing the support shaft 30. When the first inner frame member 36 is to be positioned in the manufacturing jig 90, the pin 92 is inserted from an opposite side to a side where the ring-shaped protruded part 361 is disposed, and an end face of the first inner frame member 36 on an opposite side to the side where the ring-shaped protruded part 361 is disposed is abutted with the bottom face 94 of the circular recessed part 91.

In the second process, gel material "G" is filled in the space "S" between the first inner frame member 36 and the first outer frame member 51 from a dispenser 93. In this case, primer 13 is applied to the outer peripheral face 360 of the first inner frame member 36 and the inner peripheral face 510 of the first outer frame member 51 before the gel material "G" is filled in the space "S". The application of the primer 13 may be performed before the first inner frame member 36 and the first outer frame member 51 are positioned in the manufacturing jig 90 or may be performed after having been positioned.

In the third process, the gel material "G" is heated together with the manufacturing jig 90 and is hardened by maintaining a predetermined time period at a predetermined temperature. As a result, the first connection body 11 which is a gel member is formed in the space "S". A portion of the gel material "G" which is contacted with the primer 13 reacts with the primer 13 when heated and hardened to be fixed to the outer peripheral face 360 of the first inner frame member 36 and the inner peripheral face 510 of the first outer frame member 51. Therefore, the first connection body 11 is fixed to the first inner frame member 36 and the first outer frame member 51 by an adhesive force of the first connection body 11 itself.

In the fourth process, the completed first connection body 11 is detached from the manufacturing jig 90 together with the first inner frame member 36 and the first outer frame member 51. For example, the bottom face 94 of the circular recessed part 91 is provided with a through-hole (not shown) for disposing a protrusion pin, and the first connection body 11 is detached from the manufacturing jig 90 together with the first inner frame member 36 and the first outer frame member 51.

State of Connection Body Before Assembling

FIGS. 4A and 4B show the first connection body 11 and the second connection body 12 in a state that they are structured as one part before the actuator 1 is to be assembled, and show states that the first connection body 11 and the second connection body 12 are not shear-deformed. First, shapes of the first connection body 11 and the second connection body 12 which are not shear-deformed will be described below with reference to FIGS. 4A and 4B.

As shown in FIG. 4A, the first connection body 11 is provided with a first end face 111 of the first connection body 11 which faces one side "L1" in the axial line "L" direction and a second end face 112 of the first connection body 11 which faces the other side "L2" in the axial line "L" direction. As shown in FIG. 4B, the second connection body 12 is provided with a first end face 121 of the second connection body 12 which faces the other side "L2" in the axial line "L" direction and a second end face 122 of the second connection body which faces one side "L1" in the axial line "L" direction. The first connection body 11 and the second connection body 12 are disposed in a reverse posture, and the second end face 112 of the first connection body 11 and the second end face 122 of the second connection body 12 are faced each other.

The first end face 111 of the first connection body 11 and the first end face 121 of the second connection body 12 are formed by the bottom face 94 of the circular recessed part 91. Therefore, in a state that the first connection body 11 is not shear-deformed, the first end face 111 of the first connection body 11 is a flat face and is located on the same face as an end face on one side "L1" of the first inner frame member 36 and an end face on one side "L1" of the first outer frame member 51 (see FIG. 4A). Similarly, in a state that the second connection body 12 is not shear-deformed, the first end face 121 of the second connection body 12 is a flat face and is located on the same face as an end face on the other side "L2" of the second inner frame member 37 and an end face on the other side "L2" of the second outer frame member 52 (see FIG. 4B).

The second end face 112 of the first connection body 11 and the second end face 122 of the second connection body 12 are formed in a recessed face. The second end face 112 of the first connection body 11 and the second end face 122 of the second connection body 12 are formed in a shape which is recessed by surface tension of the gel material "G" at the time of forming.

In this embodiment, a length in the axial line "L" direction of the first inner frame member 36 is larger than that of the first outer frame member 51. Therefore, the first inner frame member 36 is protruded to the other side "L2" with respect to the end part on the other side "L2" of the first outer frame member 51. Similarly, a length in the axial line "L" direction of the second inner frame member 37 is larger than that of the second outer frame member 52, and the second inner frame member 37 is protruded to one side "L1" with respect to the end part on one side "L1" of the second outer frame member 52. In a case that the actuator 1 is to be assembled, when the actuator 1 is assembled so that a side that the first inner frame member 36 is protruded and a side that the second inner frame member 37 is protruded are faced each other, the first connection body 11 and the second connection body 12 are assembled so that the second end face 112 of the first connection body 11 and the second end face 122 of the second connection body 12 are faced each other.

State of Connection Body After Assembled

Figure 6:
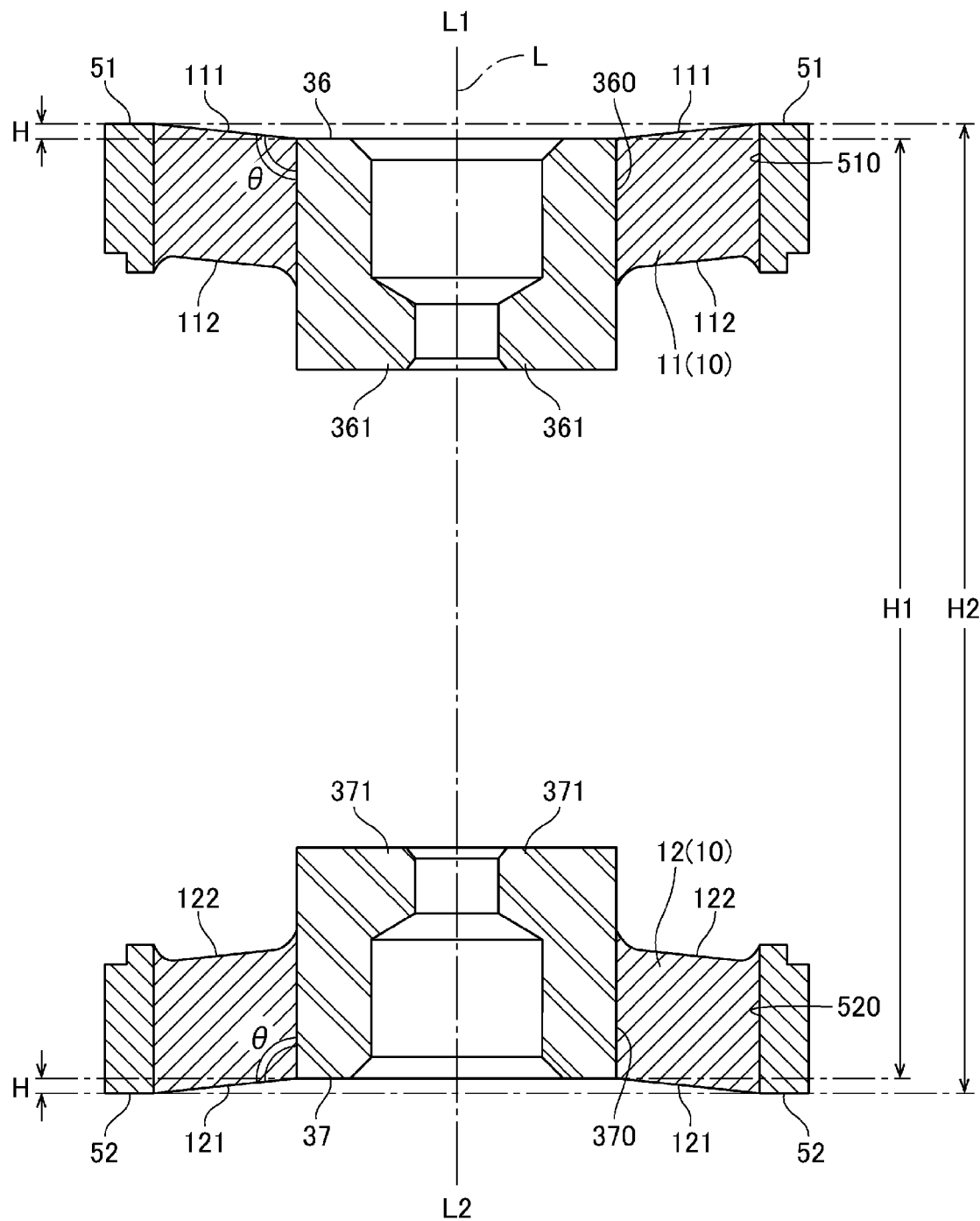
FIG. 6 is a cross-sectional view schematically showing a state of a connection body when a movable body is located at a home position.

FIG. 6 is a cross-sectional view schematically showing a state of the connection body 10 when the movable body 3 is located at a home position and shows states of the first connection body 11 and the second connection body 12 when the actuator 1 has been assembled. In FIG. 6, shearing deformation amounts (distance "H") of the first connection body 11 and the second connection body 12 are largely indicated in comparison with the actual actuator 1.

The actuator 1 is structured so that, in a state that the movable body 3 is located at a home position, the first connection body 11 and the second connection body 12 are set in states that they are shear-deformed in reverse directions in the axial line "L" direction. As shown in FIG. 3, the first inner frame member 36 and the second inner frame member 37 are abutted with the supported member (magnet 61 and yoke 35) from both sides in the axial line "L" direction to support the supported member. As a result, a distance "H1" between the end face on one side "L1" of the first inner frame member 36 and the end face on the other side "L2" of the second inner frame member 37 is determined. On the other hand, the first outer frame member 51 and the second outer frame member 52 are positioned by the first step part 44 of the coil holder 4 and the second step part 45 of the case 20 in the axial line "L" direction. As a result, a distance "H2" between the end face on one side "L1" of the first outer frame member 51 and the end face on the other side "L2" of the second outer frame member 52 is determined. In the actuator 1, dimensions and arrangement of the respective members are determined so that the distance "H1" is smaller than the distance "H2" by a predetermined dimension.

In this embodiment, the distance "H1" is smaller than the distance "H2" and thus, as shown in FIG. 6, the first inner frame member 36 and the first outer frame member 51, and the second inner frame member 37 and the second outer frame member 52 are respectively relatively moved in the axial line "L" direction from the states of the parts shown in FIGS. 4A and 4B. When a relative movement amount of the first inner frame member 36 with respect to the first outer frame member 51 and a relative movement amount of the second inner frame member 37 with respect to the second outer frame member 52 are defined as "H", "H=(H2−H1)/2".

As described above, the first inner frame member 36 and the first outer frame member 51, and the second inner frame member 37 and the second outer frame member 52 are respectively relatively moved in the axial line "L" direction and thus, the first connection body 11 and the second connection body 12 are shear-deformed in the axial line "L" direction. More specifically, an inner peripheral part of the first connection body 11 is pulled to the other side "L2" in the axial line "L" direction (in other words, to a side of the second connection body 12) with respect to its outer peripheral part, and the first connection body 11 is shear-deformed. Further, an inner peripheral part of the second connection body 12 is pulled to one side "L1" in the axial line "L" direction (in other words, to a side of the first connection body 11) with respect to its outer peripheral part, and the second connection body 12 is shear-deformed. In other words, the first connection body 11 and the second connection body 12 are pulled in directions so that their inner peripheral parts are come close to each other and are shear-deformed in reverse directions in the axial line "L" direction.

In this embodiment, an inner peripheral edge of the first end face 111 of the first connection body 11 which is a flat face in a state as one part is, as shown in FIG. 6, located on the other side "L2" (in other words, to a side that the second connection body 12 is disposed) with respect to its outer peripheral edge, and the first end face 111 of the first connection body 11 becomes an inclined face toward the other side "L2" as going to the inner peripheral side. Therefore, an angle θ formed by the inner peripheral edge of the first end face 111 of the first connection body 11 and the outer peripheral face 360 of the first inner frame member 36 becomes an obtuse angle. Similarly, an inner peripheral edge of the first end face 121 of the second connection body 12 that is a flat face in a state as one part is, as shown in FIG. 6, located on one side "L1" (in other words, to a side that the first connection body 11 is disposed) with respect to its outer peripheral edge, and the first end face 121 of the second connection body 12 becomes an inclined face toward one side "L1" as going to the inner peripheral side. Therefore, an angle θ formed by the inner peripheral edge of the first end face 121 of the second connection body 12 and the outer peripheral face 370 of the second inner frame member 37 becomes an obtuse angle.

As shown in FIG. 4A, in a state that the first connection body 11 is not shear-deformed, an angle formed by the first end face 111 of the first connection body 11 and the outer peripheral face 360 of the first inner frame member 36 is 90°. However, in this embodiment, as described above, the first connection body 11 is shear-deformed and thus, the angle θ is larger than 90°. In a case that the angle θ is large in a state that the movable body 3 is located at a home position, when the movable body 3 is vibrated in the axial line "L" direction, the angle θ is hard to become small and thus, stress applied to the inner peripheral part of the first connection body 11 can be relaxed. Therefore, the first connection body 11 is hard to be separated from the outer peripheral face 360 of the first inner frame member 36. Similarly, the second connection body 12 is hard to be separated from the outer peripheral face 370 of the second inner frame member 37. Accordingly, durability of the actuator 1 can be enhanced.

Principal Effects in this Embodiment

As described above, the actuator 1 in this embodiment includes the support body 2, the movable body 3, the connection body 10 which is connected with the support body 2 and the movable body 3 and is provided with at least one of elasticity and viscoelasticity, and the magnetic drive mechanism 6 structured to relatively move the movable body 3 with respect to the support body 2. The connection body 10 includes the first connection body 11, which is disposed on one end side in the axial line "L" direction of the movable body 3 (in other words, in the vibration direction of the movable body 3), and the second connection body 12 which is disposed on the other end side in the axial line "L" direction of the movable body 3. The first connection body 11 and the second connection body 12 are formed in a tube shape, and the inner peripheral part of the first connection body 11 and the inner peripheral part of the second connection body 12 are connected with the movable body 3, and the outer peripheral part of the first connection body 11 and the outer peripheral part of the second connection body 12 are connected with the support body 2. In a state that the movable body 3 is located at a home position, an inner peripheral part of the first connection body 11 is pulled to a side of the second connection body 12 with respect to its outer peripheral part and is shear-deformed, and an inner peripheral part of the second connection body 12 is pulled to a side of the first connection body 11 with respect to its outer peripheral part and is shear-deformed.

As described above, in this embodiment, when the movable body 3 is located at the home position, the inner peripheral part of the first connection body 11 and the inner peripheral part of the second connection body 12 are pulled in directions coming close to each other and are shear-deformed. As a result, a size in the axial line "L" direction of the movable body 3 can be reduced and clearances to be secured on both sides in the axial line "L" direction of the movable body 3 can be reduced. Therefore, a length in the axial line "L" direction of the actuator 1 can be reduced. Further, the inner peripheral parts of the first connection body 11 and the second connection body 12 are portions where stress is concentrated at the time of vibration of the movable body 3. However, when the portions are previously pulled toward a center in the vibration direction of the movable body 3 and are shear-deformed, as described above, when the movable body 3 is vibrated, stresses applied to the inner peripheral parts of the first connection body 11 and the second connection body 12 can be relaxed. Therefore, there is less possibility that the inner peripheral parts of the first connection body 11 and the second connection body 12 are separated from the movable body 3. Accordingly, durability of the actuator 1 is enhanced.

In this embodiment, shearing deformation amounts (distance "H" shown in FIG. 6) of the first connection body 11 and the second connection body 12 at the home position are small. Therefore, spring constants of the first connection body 11 and the second connection body 12 when the movable body 3 is located at the home position are substantially equal to the spring constants when the first connection body 11 and the second connection body 12 are not shear-deformed. Therefore, a size of the actuator 1 can be reduced without affecting the vibration characteristics of the movable body 3.

In this embodiment, the first connection body 11 is provided with the first end face 111 of the first connection body 11 facing the opposite side to the second connection body 12 (to one side "L1"), and the second connection body 12 is provided with the first end face 121 of the second connection body 12 which faces the opposite side to the first connection body 11 (to the other side "L2"). In a state that the movable body 3 is located at the home position, the first end face 111 of the first connection body and the first end face 121 of the second connection body 12 are formed so that their inner peripheral edges connected with the movable body 3 are formed in a shape so as to be recessed toward the center in the axial line "L" direction of the movable body 3. In other words, the inner peripheral edge of the first end face 111 of the first connection body 11 is located on the second connection body 12 side (the other side "L2") with respect to the outer peripheral edge of the first end face 111 of the first connection body 11, and the inner peripheral edge of the first end face 121 of the second connection body 12 is located on the first connection body 11 side (one side "L1") with respect to the outer peripheral edge of the first end face 121 of the second connection body 12. In a case that the end face is set in such a shape at the home position, when the movable body 3 is vibrated, the angle θ formed by the outer peripheral face 360 of the first inner frame member 36 and the first end face 111 of the first connection body 11, and the angle θ formed by the outer peripheral face 370 of the second inner frame member 37 and the first end face 121 of the second connection body 12 are hard to become small. Therefore, when the movable body 3 is vibrated, there is less possibility that the first connection body 11 is separated from the outer peripheral face 360 of the first inner frame member 36, and there is less possibility that the inner peripheral part of the second connection body 12 is separated from the outer peripheral face 370 of the second inner frame member 37. Accordingly, durability of the actuator 1 can be enhanced.

In this embodiment, the first connection body 11 is provided with the second end face 112 of the first connection body 11 which faces an opposite side (the other side "L2") to the first end face 111 of the first connection body 11, and the second end face 112 of the first connection body 11 is recessed to a side of the first end face 111 (one side "L1") of the first connection body 11. Further, the second connection body 12 is provided with the second end face 122 of the second connection body 12 which faces an opposite side (one side "L1") to the first end face 121 of the second connection body 12, and the second end face 122 of the second connection body 12 is recessed to a side of the first end face 121 (the other side "L2") of the second connection body 12. In this embodiment, the first connection body 11 and the second connection body 12 are gel members and are manufactured by casting. Therefore, the second end face 112 of the first connection body 11 and the second end face 122 of the second connection body 12 are formed to be a recessed face by surface tension of the gel material. The first connection body 11 and the second connection body 12 are easily manufactured by casting and, in addition, at the time of forming, the first connection body 11 can be connected with the first inner frame member 36 and the first outer frame member 51 by an adhesive force of the gel member itself, and the second connection body 12 can be connected with the second inner frame member 37 and the second outer frame member 52 by an adhesive force of the gel member itself. Therefore, at the time of assembling of the actuator 1, a process for fixing the first connection body 11 and the second connection body 12 by an adhesive is not required. Accordingly, handling of the first connection body 11 and the second connection body 12 is easy and the actuator 1 is easily assembled.

In this embodiment, the magnetic drive mechanism 6 includes the magnet 61 and the coil 62, and the movable body 3 includes the support shaft 30, which supports the supported member including the magnet 61 (magnet 61 and yoke 35) on an inner peripheral side with respect to the support body 2, the first inner frame member 36 fixed to one end side of the support shaft 30, and the second inner frame member 37 fixed to the other end side of the support shaft 30. The support body 2 includes the first outer frame member 51, which faces the first inner frame member 36 in the radial direction, and the second outer frame member 52 which faces the second inner frame member 37 in the radial direction. The first connection body 11 is connected with the first inner frame member 36 and the first outer frame member 51, and the second connection body 12 is connected with the second inner frame member 37 and the second outer frame member 52. As described above, in this embodiment, both ends of the movable body 3 assembled with the support shaft 30 as a center are supported by the first connection body 11 and the second connection body 12 and thus, the movable body 3 can be stably supported. Further, the first connection body 11 is disposed in a space in the radial direction between the first inner frame member 36 and the first outer frame member 51, and the second connection body 12 is disposed in a space in the radial direction between the second inner frame member 37 and the second outer frame member 52 and thus, the movable body 3 is hard to move in a direction different from the vibration direction. Therefore, there is less possibility that the movable body 3 is moved in an unintended direction and is collided with the support body 2.

In this embodiment, the first inner frame member 36 is protruded to the second connection body 12 side (the other side "L2") with respect to the first connection body 11 and the first outer frame member 51, and the second inner frame member 37 is protruded to the first connection body 11 side (one side "L1") with respect to the second connection body 12 and the second outer frame member 52. As described above, when the inner frame member is protruded from the outer frame member, the front side and the rear side of each of the first connection body 11 and the second connection body 12 can be recognized at a glance. Therefore, assembling operations of the first connection body 11 and the second connection body 12 in a reverse posture in the axial line "L" direction can be easily and correctly performed.

In this embodiment, the first inner frame member 36 is provided with the ring-shaped protruded part 361 (first fixing part) to which the support shaft 30 is press-fitted, and the second inner frame member 37 is provided with the ring-shaped protruded part 371 (second fixing part) to which the support shaft 30 is press-fitted. As described above, when the first inner frame member 36 and the second inner frame member 37 are fixed by press-fitting, a fixing part such as a screw is not required and the part shape can be simplified. Therefore, a cost of the part can be reduced.

In this embodiment, the first inner frame member 36 is abutted with the supported member (magnet 61 and yoke 35) from one end side of the support shaft 30, and the second inner frame member 37 is abutted with the supported member (magnet 61 and yoke 35) from the other end side of the support shaft 30 and thus, the supported member (magnet 61 and yoke 35) can be positioned in the axial line "L" direction by the first inner frame member 36 and the second inner frame member 37. Therefore, the magnet 61 or the coil 62 included in the supported member (magnet 61 and yoke 35) is easily positioned.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
a support body;
a movable body;
a connection body which is connected with the support body and the movable body and is provided with at least one of elasticity and viscoelasticity; and
a magnetic drive mechanism structured to relatively move the movable body with respect to the support body;
wherein the connection body comprises a first connection body disposed on one end side in a vibration direction of the movable body and a second connection body disposed on an other end side in the vibration direction of the movable body;
wherein each of the first connection body and the second connection body is formed in a tube shape;
wherein an inner peripheral part of the first connection body and an inner peripheral part of the second connection body are connected with one of the movable body and the support body, and an outer peripheral part of the first connection body and an outer peripheral part of the second connection body are connected with an other of the movable body and the support body; and
wherein in a state that the movable body is located at a home position, the inner peripheral part of the first connection body is pulled to a side of the second connection body with respect to the outer peripheral part of the first connection body and is shear-deformed, and the inner peripheral part of the second connection body is pulled to a side of the first connection body with respect to the outer peripheral part of the second connection body and is shear-deformed.

2. The actuator according to claim 1, wherein
the first connection body comprises a first end face of the first connection body which faces an opposite side to the second connection body,
the second connection body comprises a first end face of the second connection body which faces an opposite side to the first connection body, and
in the state that the movable body is located at the home position, an inner peripheral edge of the first end face of the first connection body is located on a second connection body side with respect to an outer peripheral edge of the first end face of the first connection body, and an inner peripheral edge of the first end face of the second connection body is located on a first connection body side with respect to an outer peripheral edge of the first end face of the second connection body.

3. The actuator according to claim 2, wherein
each of the first connection body and the second connection body is a gel member,
the first connection body comprises a second end face of the first connection body which faces an opposite side to the first end face of the first connection body, and the second end face of the first connection body is recessed to a side of the first end face of the first connection body, and
the second connection body comprises a second end face of the second connection body which faces an opposite side to the first end face of the second connection body, and the second end face of the second connection body is recessed to a side of the first end face of the second connection body.

4. The actuator according to claim 1, wherein
the magnetic drive mechanism comprises a magnet and a coil;
the movable body comprises:
a support shaft which supports a supported member including one of the magnet and the coil on an inner peripheral side with respect to the support body;
a first inner frame member which is fixed to one end side of the support shaft; and
a second inner frame member which is fixed to an other end side of the support shaft,
the support body comprises:
a first outer frame member which faces the first inner frame member in a radial direction;
a second outer frame member which faces the second inner frame member in the radial direction; and
a case in a tube shape which surrounds an outer peripheral side of the first outer frame member and an outer peripheral side of the second outer frame member, and
the first connection body is connected with the first inner frame member and the first outer frame member, and the second connection body is connected with the second inner frame member and the second outer frame member.

5. The actuator according to claim 4, wherein
the first inner frame member is protruded to a second connection body side with respect to an end part on the second connection body side of the first outer frame member, and
the second inner frame member is protruded to a first connection body side with respect to an end part on the first connection body side of the second outer frame member.

6. The actuator according to claim 4, wherein
the first inner frame member comprises a first fixing part to which the support shaft is press-fitted, and
the second inner frame member comprises a second fixing part to which the support shaft is press-fitted.

7. The actuator according to claim 4, wherein
the first inner frame member is abutted with the supported member from the one end side of the support shaft, and
the second inner frame member is abutted with the supported member from the other end side of the support shaft.

* * * * *